(12) United States Patent
Chung et al.

(10) Patent No.: US 7,576,904 B2
(45) Date of Patent: *Aug. 18, 2009

(54) ELECTRO-MAGNETOPHORESIS DISPLAY

(75) Inventors: Jerry Chung, Mountain View, CA (US); Rong-Chang Liang, Cupertino, CA (US)

(73) Assignee: Sipix Imaging, Inc., Fremont, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 11/545,091

(22) Filed: Oct. 6, 2006
(Under 37 CFR 1.47)

(65) Prior Publication Data
US 2007/0268567 A1    Nov. 22, 2007

Related U.S. Application Data

(63) Continuation-in-part of application No. 11/115,645, filed on Apr. 26, 2005, now Pat. No. 7,142,351, which is a continuation-in-part of application No. 10/421,217, filed on Apr. 22, 2003, now Pat. No. 6,914,713, said application No. 11/545,091 is a continuation-in-part of application No. 09/518,488, filed on Mar. 3, 2000, now Pat. No. 6,930,818.

(60) Provisional application No. 60/375,299, filed on Apr. 23, 2002.

(51) Int. Cl.
*G02B 26/00* (2006.01)
*G09G 3/34* (2006.01)
*G03G 13/00* (2006.01)

(52) U.S. Cl. ................ 359/296; 345/107; 430/31

(58) Field of Classification Search ........ 359/245, 359/253–254, 265, 290–291, 296; 349/33; 345/107; 430/31, 32
See application file for complete search history.

(56) References Cited

U.S. PATENT DOCUMENTS

3,612,758 A    10/1971    Evans (Continued)

FOREIGN PATENT DOCUMENTS

| JP | 04-345133 | 12/1992 |
|----|-----------|---------|
| JP | 2000 275686 | 6/2000 |
| WO | WO 01/067170 | 9/2001 |
| WO | WO 02/01281 | 1/2002 |
| WO | WO 02/056097 | 7/2002 |
| WO | WO 02/065215 | 8/2002 |
| WO | WO 02/093245 | 11/2002 |

OTHER PUBLICATIONS

Allen, K. (Oct. 2003). Electrophoretics Fulfilled. *Emerging Displays Review: Emerging Display Technologies, Monthly Report*—Oct. 2003, 9-14.

(Continued)

*Primary Examiner*—Scott J Sugarman
*Assistant Examiner*—Dawayne A Pinkney
(74) *Attorney, Agent, or Firm*—Howrey LLP

(57) ABSTRACT

The present invention is directed to an electro-magnetophoresis display having either the traditional up/down or dual switching mode. The display cells are filled with an electro-magnetophoretic dispersion comprising particles suspended in a solvent and the particles are both charged and magnetized. The display of the invention prevents undesired movement of the particles in the cells. The magnetic force generated by the magnetic layer(s) eliminates the need to provide cells with a threshold voltage high enough to avoid the cross talk and/or cross bias effects. In addition, the dual switching mode allows the particles to move in the up/down direction as well as the planar direction, thus providing a multicolor display of high color quality at very low cost.

19 Claims, 8 Drawing Sheets

U.S. PATENT DOCUMENTS

| | | | |
|---|---|---|---|
| 3,668,106 A | | 6/1972 | Ota |
| 4,092,290 A | * | 5/1978 | Bowser ..................... 524/443 |
| 4,552,928 A | | 11/1985 | Bauld et al. |
| 4,594,400 A | | 6/1986 | Kvita et al. |
| 4,631,328 A | | 12/1986 | Ringsdorf et al. |
| 4,655,897 A | | 4/1987 | DiSanto et al. |
| 4,769,443 A | | 9/1988 | Cantatore |
| 5,177,476 A | | 1/1993 | DiSanto et al. |
| 5,930,026 A | | 7/1999 | Jacobson et al. |
| 5,961,804 A | | 10/1999 | Jacobson et al. |
| 6,025,896 A | | 2/2000 | Hattori et al. |
| 6,172,798 B1 | | 1/2001 | Albert et al. |
| 6,239,896 B1 | * | 5/2001 | Ikeda ......................... 359/240 |
| 6,259,498 B1 | * | 7/2001 | Takeda ........................ 349/84 |
| 6,577,433 B1 | * | 6/2003 | Lin et al. .................... 359/296 |
| 6,656,587 B2 | | 12/2003 | Johnson et al. |
| 6,672,921 B1 | | 1/2004 | Liang et al. |
| 6,693,621 B1 | | 2/2004 | Hayakawa et al. |
| 6,795,138 B2 | | 9/2004 | Liang et al. |
| 6,930,818 B1 | * | 8/2005 | Liang et al. .................. 359/296 |
| 6,933,098 B2 | | 8/2005 | Chan-Park et al. |
| 7,142,351 B2 | | 11/2006 | Chung et al. |
| 2002/0008898 A1 | | 1/2002 | Katase |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12 — 3-16.

Chaug, Y.S., Haubrich, J.E., Sereda, M. And Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI.* 1-10. (in Chinese, English abstract attached, full translation availabe upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Applicaiton*. Presentation conducted at USDC 4th Annual Flexible Display Conference 2005.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Hopper, M., et al. (1979) an Electrophoretic Display, Its Properties, Model and Addressing, *IEEE Trans. Electr. Dev.*, 26(8), 1148-1152.

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Kamachi, M. (1997) Magnet Polymers, *Functional Monomers and polymer*, Chapter 5, pp. 149-171, Marcel Dekker, Inc.

Lee, H., & Liang, R.C. (Jun. 2003) SiPix Microcup(R) Electronic Paper — an Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to- Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper — A Technology Overview*. Paper presented at the METS 2004 Conference in Taipie, Taiwan.

Liang, R.C., (Feb. 2005) *Flexible and Roll-able Displays/Electronic Paper — A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-toRoll Manufacturing Processes. *IDW*, EP2-2, 1337-1340.

Liang, R.C., Hou, J., Zang, 1-LM., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) <<Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises — Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China,.

Wang, X., Kiluk, S., Chang, C., & Uang, R.C., (Jun. 2004) Microcup® Electronic Paper and the Converting Processes. *Advanced Display*, Issue 43, 48-51.

Wang, X., Li, P., Sodhi, D., Xu, T. And Bruner, S. et al., (Feb. 2006) *Inkjet Fabrication of Multi- Color Microcup® Electrophorectic Display*. The Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, pp1587-1589.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* Vol. 5289, 102-108.

Zang, H.M., & Liang, R.C. (2003) Microcup Electronic Paper by Roll-to-Roll Manufacturing Processes. *The Spectrum*, 16(2), 16-21.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp362-365.

\* cited by examiner

ELECTRO-MAGNETOPHORESIS DISPLAY

This application is a continuation-in-part of U.S. Ser. No. 11/115,645, filed Apr. 26, 2005 now U.S. Pat. No. 7,142,351; which is a continuation-in-part of U.S. Ser. No. 10/421,217, filed Apr. 22, 2003, now U.S. Pat. No. 6,914,713; which claims the benefit of U.S. Provisional Application 60/375,299, filed Apr. 23, 2002. This application is also a continuation-in-part application of U.S. Ser. No. 09/518,488, filed Mar. 3, 2000, now U.S. Pat. No. 6,930,818; the contents of all the above applications are incorporated herein by reference in their entirety.

BACKGROUND OF THE INVENTION

The electrophoretic display (EPD or EPID) is a non-emissive device based on the electrophoresis phenomenon of charged pigment particles suspended in a solvent. It was first proposed in 1969. The display typically comprises two plates with electrodes placed opposing each other, separated by spacers. One of the electrodes is usually transparent. A suspension composed of a colored solvent and charged pigment particles, is enclosed between the two plates. When a voltage difference is imposed between the two electrodes, the pigment particles migrate to one side and then either the color of the pigment or the color of the solvent can be seen according to the polarity of the voltage difference.

There are several different types of EPDs. In the partition type EPD (see M. A. Hopper and V. Novotny, *IEEE Trans. Electr. Dev.*, 26(8):1148-1152 (1979)), there are partitions between the two electrodes for dividing the space into smaller cells in order to prevent undesired movements of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology was disclosed in co-pending applications, U.S. Ser. No. 09/518,488, filed on Mar. 3, 2000 (corresponding to WO 01/67170), U.S. Ser. No. 09/759,212, filed on Jan. 11, 2001 (corresponding to WO 02/56097), U.S. Ser. No. 09/606,654, filed on Jun. 28, 2000 (corresponding to WO 02/01281) and U.S. Ser. No. 09/784,972, filed on Feb. 15, 2001 (corresponding to WO 02/65215), all of which are incorporated herein by reference. The improved EPD comprises closed cells formed from microcups of well-defined shape, size and aspect ratio, filled with charged pigment particles dispersed in a dielectric solvent, and sealed with a polymeric sealing layer.

All of these EPDs may be driven by a passive matrix system. For a typical passive matrix system, there are row electrodes on the top side and column electrodes on the bottom side of the cells. The top row electrodes and the bottom column electrodes are perpendicular to each other. However, there are two well-known problems which are associated with EPDs driven by a passive matrix system: cross-talk and cross-bias. Cross-talk occurs when the particles of a cell (pixel) are biased by the electric field of a neighboring cell (pixel). FIG. 1 provides an example. The bias voltage of the cell A drives the positively charged particles towards the bottom of the cell. Since cell B has no voltage bias, the positively charged particles in cell B are expected to remain at the top of the cell. However, if the two cells, A and B, are close to each other, the top electrode voltage of cell B (30V) and the bottom electrode voltage of cell A (0V) create a cross talk electric field which forces some of the particles in cell B to move downwards. Widening the distance between adjacent cells may reduce such a crosstalk effect but the resolution of the display will also be reduced.

The cross talk problem may be lessened if a cell has a significantly high threshold voltage. The threshold voltage, in the context of the present invention, is defined to be the minimum (or onset) bias voltage required to move particles away from their current position. If the cells have a sufficiently high threshold voltage, the cross-talk may be reduced or eliminated without sacrificing the resolution of the display. A high threshold voltage may be achieved by, for example, increasing the particle-particle interaction or the particle electrode interaction in the electrophoretic cells. Unfortunately, most approaches to increase the threshold voltage tend to result in a significant increase in display driving voltage or a decrease in switching rate.

In addition to the crosstalk by neighboring cells, cross bias is also possible in a passive matrix display. The voltage applied to a column electrode not only provides the driving bias for the cell on the scanning row, but it also affects the bias across the non-scanning cells on the same column. This undesired bias may force the particles of a non-scanning cell to migrate to the opposite electrode. This results in changes in image density and a significant deterioration of the display contrast. A system having gating electrodes was disclosed in U.S. Pat. Nos. 4,655,897 and 5,177,476 (assigned to Copytele, Inc.) to provide EPDs capable of high resolution at relative high driving voltage using a two layer electrode structure, one of which layers serves as a gating electrode. Although these references teach how the threshold voltage may be raised by the use of gating electrodes, the cost for fabricating the two electrode layers is extremely high due to the complexity of the structure and the low yield rate. In addition, in this type of EPDs, the electrodes are exposed to the solvent, which could result in an undesired electroplating effect and deterioration in the display operation longevity.

The in-plane switched EPD device disclosed in U.S. Pat. No. 6,239,896 uses a magnetic bottom substrate to attract the magnetic particles and provide a threshold effect against the undesirable particle movement. The row and column electrodes are implemented on the bottom layers forming the driving dot matrix. The in-plane electrodes are significantly more difficult to manufacture than the normal up-down electrodes, particularly for high resolution displays. The switching rate of the in-plane displays are slower at a comparable operation voltage since the distance between electrodes in the in-plane switching mode is typically larger than the normal up-down mode. Moreover, the color saturation of a color display will be poor due to the lack of either true white or true black state.

Therefore, there is still a need for an electrophoretic display in which the cross talk and cross bias effects will not cause a degradation of display performance, even if cells having a relatively low intrinsic threshold voltage are used.

SUMMARY OF THE INVENTION

The present invention has two aspects. The first aspect is directed to an electro-magnetophoresis display having the traditional up/down switching mode. The display comprises one top row electrode layer, one bottom column electrode layer and an array of cells sandwiched between the two electrode layers. In one embodiment of this aspect of the invention, one switchable magnetic layer is placed underneath the bottom electrode layer. In another embodiment, there are two switchable magnetic layers, one placed on top of the top row electrode layer and the other placed underneath the bottom electrode layer. In a third embodiment, there is one permanent magnetic layer placed on top of the top row electrode layer, and one switchable magnetic layer placed underneath the bottom electrode layer. In a fourth embodiment, there is one permanent magnetic layer placed on top of the top row electrode layer, and one permanent magnetic layer placed underneath the bottom electrode layer.

The second aspect of the invention is directed to a dual mode electro-magnetophoresis display. The display also comprises one top row electrode layer, one bottom column electrode layer and an array of cells sandwiched between the two layers. The bottom column electrode layer for each cell, however, comprises one center electrode and two side electrodes, which are placed on the two sides of the center electrode. In one embodiment of this aspect of the invention, there is a switchable magnetic layer placed underneath the bottom column electrode layer. In a second embodiment, there are two switchable magnetic layers, one of which is placed on top of the top row electrode layer and the other is placed underneath the bottom column electrode layer. In a third embodiment, there is one permanent magnetic layer placed on top of the top row electrode layer, and one switchable magnetic layer placed underneath the bottom electrode layer. In a fourth embodiment, there is one permanent magnetic layer placed on top of the top row electrode layer and one permanent magnetic layer placed underneath the bottom electrode layer.

In all embodiments of the invention, the top side is the viewing side and therefore at least the top row electrode layer and the top magnetic layer (if present) are transparent.

The cells are filled with an electromagnetophoretic fluid comprising charged magnetic particles dispersed in a contrast-colored dielectric solvent. When the charged magnetic particles are attracted to the viewing side, the color (the primary color) of the magnetic particles is seen. In contrast, the color of the solvent or its additive color with the background is seen when they are attracted away from the viewing side. The solvent may be colored by a pigment or dye.

The design of the present invention has many advantages. First of all, it prevents undesired movement of the charged particles in the cells. The magnetic force generated by the magnetic layer(s) eliminates the need to provide cells with a threshold voltage high enough to avoid the cross-talk and/or cross-bias effects. In addition, the dual switching mode allows the particles to move in the up/down direction as well as the planar direction, thus providing a multicolor display of high color quality at very low cost.

These and other features and advantages of the present invention will be presented in more detail in the following detailed description and the accompanying figures, which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
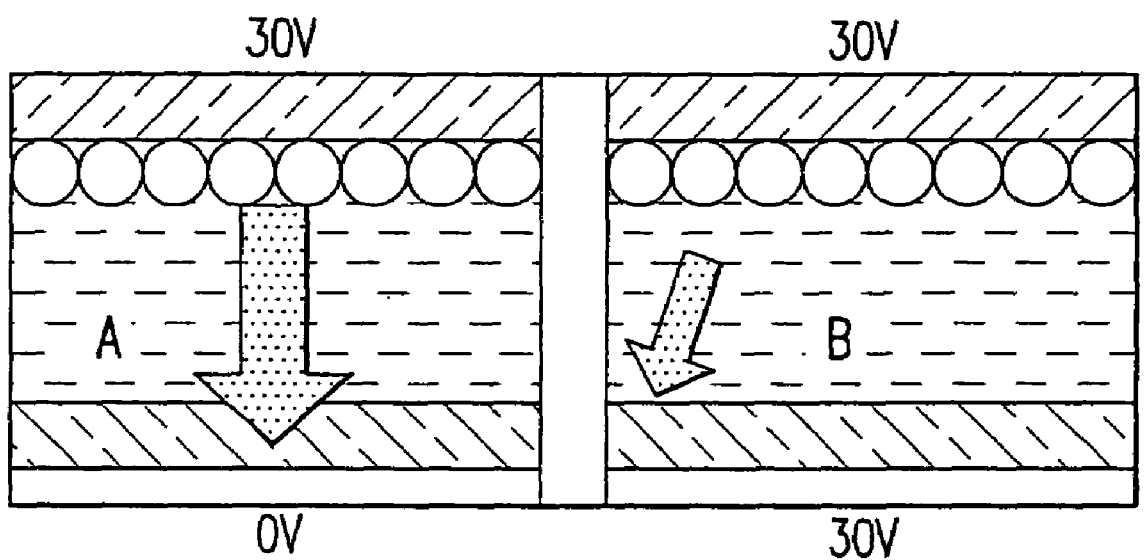
FIG. 1 illustrates the "cross-talk" phenomenon of an EPD.

A detailed description of representative embodiments of the invention is provided below. While the invention is described in conjunction with representative embodiments, it should be understood that the invention is not limited to these embodiments. In order to meet the specific requirements of a particular EMPD, the design and dimensions of the features may vary and all such variations are within the scope of the present invention. To illustrate this invention, numerous specific details are set forth in the following description. The present invention may be practiced according to the claims without some or all of these specific details. For the purpose of clarity, technical material that is known in the technical fields related to the invention has not been described in detail so that the present invention is not unnecessarily obscured.

I. Definitions

Unless defined otherwise in this specification, all technical terms are used herein according to their conventional definitions as they are commonly used and understood by those of ordinary skill in the art.

The term "threshold voltage" in the context of the present invention is defined as the minimum (or onset) bias voltage required to move particles away from their current position. The particle threshold effect is one of the most important characteristics of the electrophoretic display and is a function of the particle-particle, particle-solvent and particle electrode interactions.

The term "driving voltage", in the context of the present disclosure, is defined as the bias voltage applied to change the color state of a cell, such as by driving the particles in the cell from an initial position at or near one electrode to an end position at or near another electrode. The driving voltage used in a particular application must be sufficient to cause the color state of the cell to change within the required performance parameters of the application, including as measured by such parameters as the time it takes for the state transition to be completed.

The term "scanning row" in a passive matrix display is a row in the display that is currently being updated or addressed.

The term "non-scanned row" is a row that has not been updated or addressed.

The term "scanned row" is a row that has been updated or addressed.

For a cell in a scanning row, the driving voltage (i.e., bias conditions) should either drive the particles to a desired new location or maintain the particles at the same location. For a cell on either a scanned row or non-scanned row, the driving voltage should maintain the particles at the same location even if the bottom column driver voltage (i.e., the voltage applied to the column electrode associated with the cell) changes, such as may occur if a cell in the scanning row in that column is being switched (i.e., under a cross bias condition). A passive matrix electrophoretic display is usually updated ("scanned") one row at a time, with the goal being to update the cells of the scanning row while leaving the cells in the scanned and non-scanned rows unchanged.

The term "positive bias", in the context of the present disclosure, is defined as a bias that tends to cause positively charged particles to migrate downwards (i.e., upper electrode at higher potential than lower electrode).

The term "negative bias", in the context of the present disclosure, is defined as a bias that tends to cause positively charged particles to migrate upwards (i.e., lower electrode at higher potential than upper electrode).

In the context of the present invention, the magnetic force generated between the particles and the magnetic layer(s) may be referred to as "magnetic force TM" or "magnetic force BM". When there is only one bottom magnetic layer, "magnetic force TM" is the magnetic force formed between the magnetic layer and the particles when the particles are at the top of a cell and "magnetic force BM" is the magnetic force formed between the magnetic layer and the particles when the particles are at the bottom of a cell. Because of the distance between the bottom magnetic layer and the top of the display, "magnetic force BM" is always greater than "magnetic force TM" when there is only one bottom magnetic layer. In the case of two magnetic layers one of which is at the top of a cell and the other is at the bottom of the cell, particles on the top of the cell form a "magnetic force TM" with the top magnetic layer, and particles at the bottom form a "magnetic force BM" with the bottom magnetic layer.

In the context of the present invention, each of the magnetic forces TM and BM may be converted to a bias voltage, which attracts the particles with a force equivalent to the magnetic force. If the magnetic force is expressed as $$Fm = M \cdot \nabla |B|$$

in which M is the magnetization of the magnetic particles and $\nabla |B|$ is the gradient of the magnetic field, the equivalent bias voltage is then $$Vm = Fm \cdot d/q$$

in which q is the charge of the particle and d is the distance between the top and the bottom electrodes. Following this conversion, Vtm represents the equivalent bias voltage of the magnetic force TM whereas Vbm represents the equivalent bias voltage of the magnetic force BM.

The magnetic fields generated by the top and the bottom electromagnets are in the opposite direction, therefore particles at the top of the cell are attracted by the top magnetic layer and rejected by the bottom magnetic layer, particles at the bottom of the cell are attracted by the bottom magnetic layer and rejected by the top magnetic layer. In either scenario, the two magnetic forces assist each other.

The term "screening effect" means that some particles in a cell migrate faster than others and arrive at the destination electrode before the others. These fast particles actually reduce the strength of the electric field and further slow down the slower particles.

II. Various Designs of the Present Invention

Figure 2A:
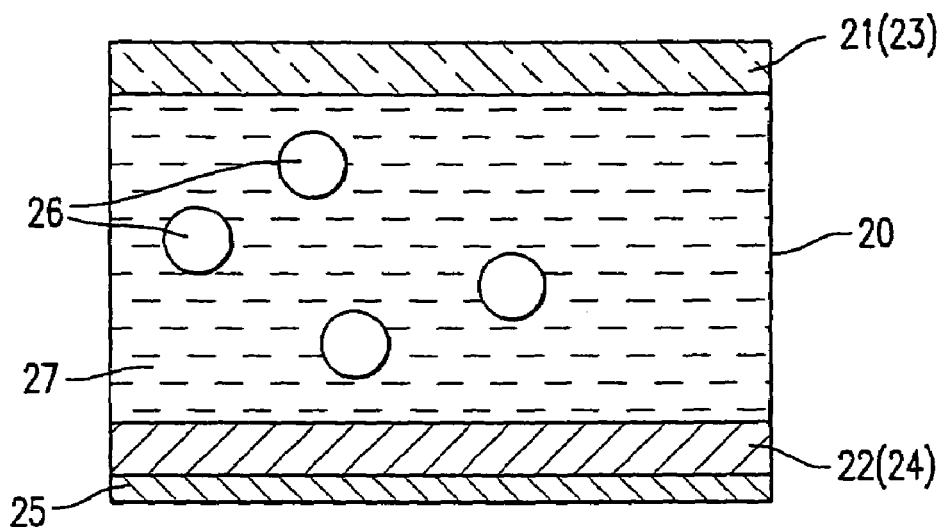
FIGS. 2A and 2B are side and top views of an electromagnetophoretic display (EMPD) of the invention having the traditional up/down switching mode and one switchable magnetic layer.
Figure 2B:
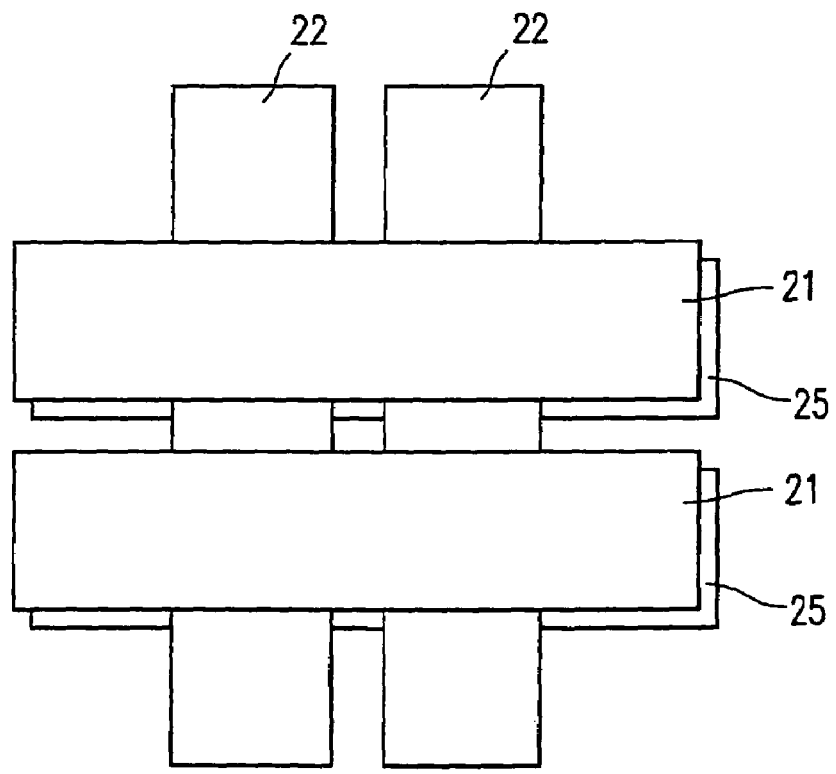

A. Electro-Magnetophoresis Display Having the Traditional Up/Down Switching Mode In one embodiment, as shown in FIG. 2A, the display comprises a top electrode layer (21) and a bottom electrode layer (22), at least one of which is transparent (e.g., top electrode layer 21), and a cell (20) positioned between the two layers. The top electrode layer (21) comprises one row electrode (23) and the bottom electrode layer (22) comprises one column electrode (24). A switchable magnetic layer (25) is placed underneath the bottom electrode layer. The top row electrodes and bottom column electrodes are cross (preferably perpendicular) to each other and the magnetic layer is aligned with the top row electrode layer (21/23) (see FIG. 2B). The display cell (20) comprises charged magnetic particles (26) dispersed in a dielectric solvent (27). In one embodiment, the particles (26) are positively charged.

Figure 3A:
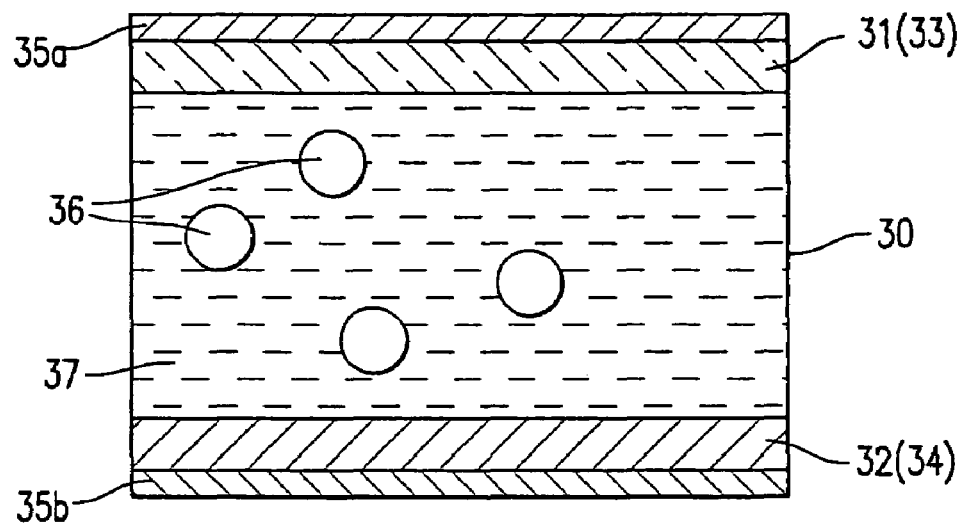
FIGS. 3A and 3B are side and top views of an EMPD device of the invention having the traditional up/down switching mode and two magnetic layers.
Figure 3B:
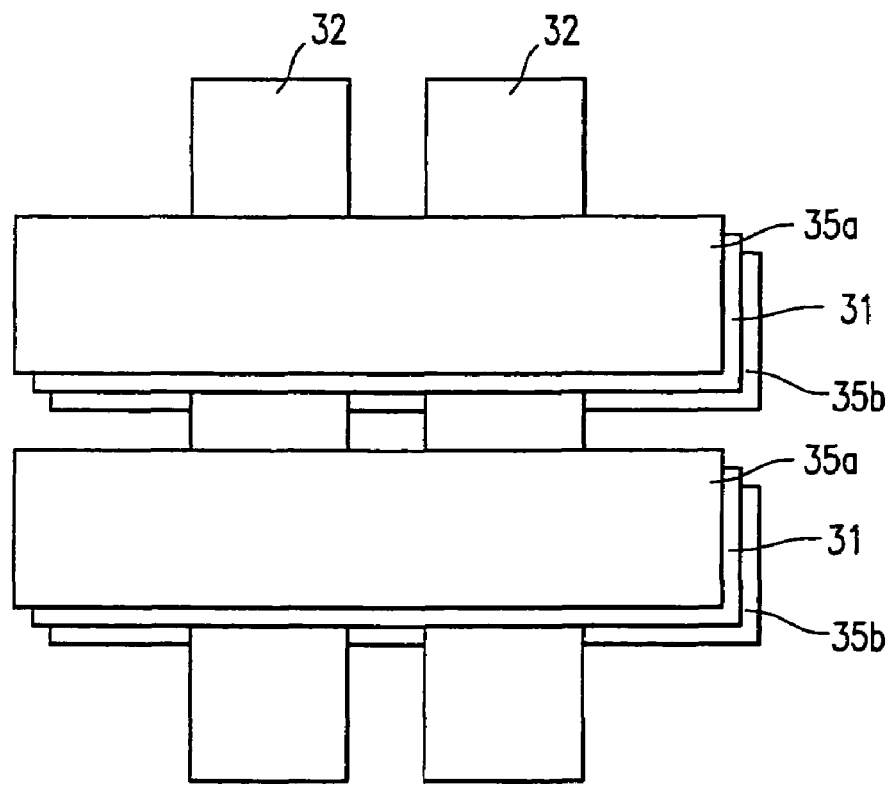

An alternative embodiment is shown in FIG. 3A, in which the basic design is similar to that of the embodiment of FIG. 2A except that there are two switchable magnetic layers (35a and 35b), one (35a) on top of the top row electrode layer (31) and the other one (35b) underneath the bottom column electrode layer (32), and the two magnetic layers are aligned with the row electrodes (31/33) as shown in FIG. 3B.

The basic design of a third alternative embodiment is similar to that of the embodiment of FIG. 3A except that the top magnetic layer (35a) on top of the top row electrode layer is permanent and the magnetic layer (35b) underneath the bottom column electrode layer is switchable.

The basic design of a fourth alternative embodiment is also similar to that of the embodiment of FIG. 3A except that both magnetic layers (35a and 35b) are permanent.

B. Electro-Magnetophoresis Display Having a Dual Switching Mode

Figure 4A:
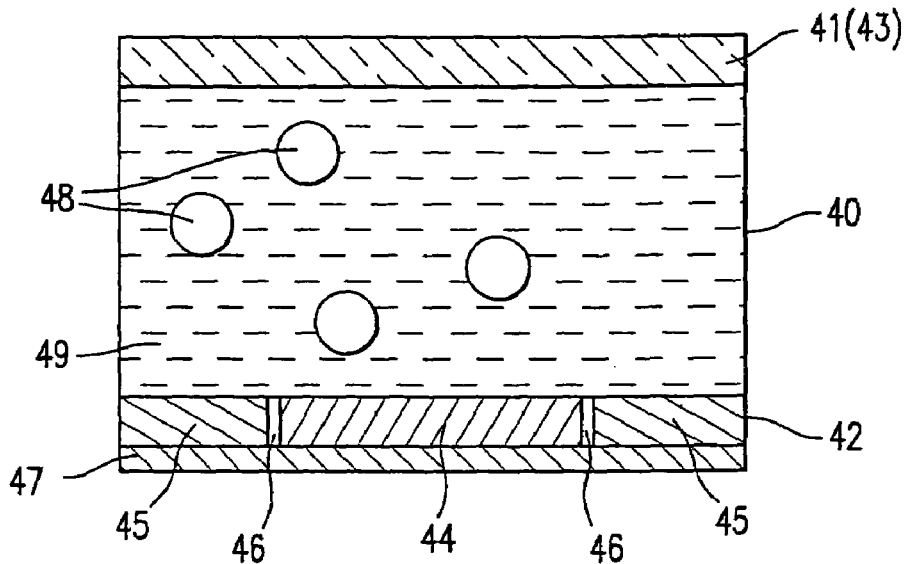
FIGS. 4A and 4B are side and top views of an EMPD device of the invention having a dual mode and one switchable magnetic layer.
Figure 4B:
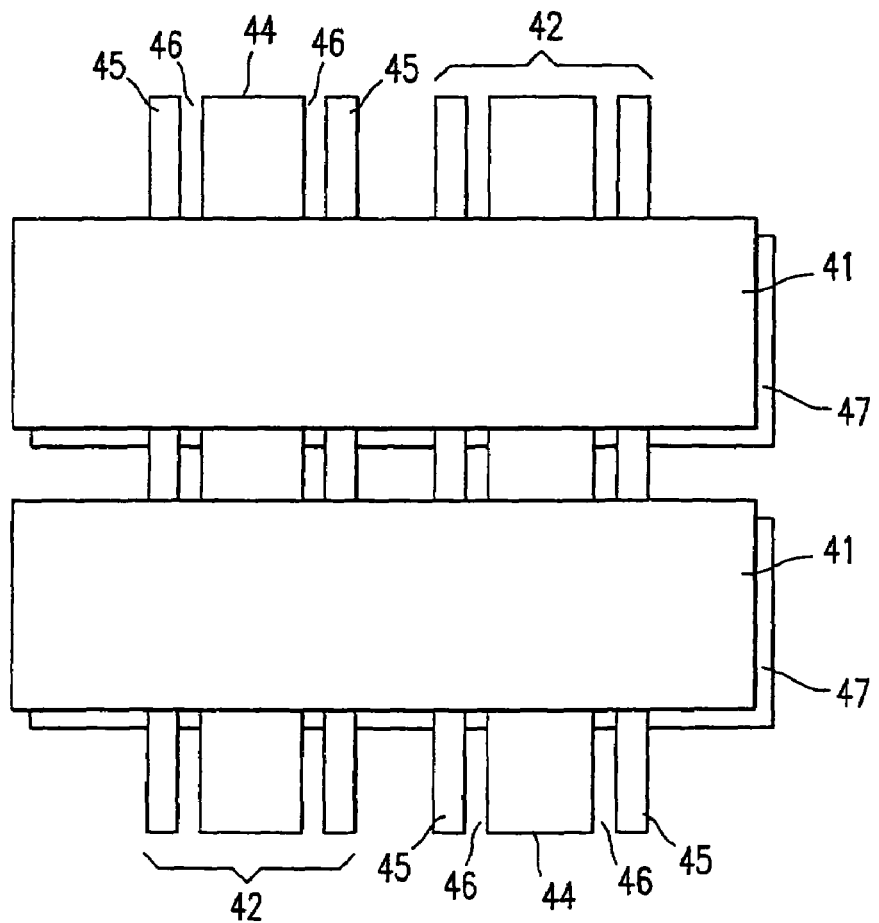

In one embodiment, as shown in FIG. 4A, the display comprises a top electrode layer (41) and a bottom electrode layer (42), at least the one on the viewing side is transparent (the top electrode layer 41), and a cell (40) positioned between the two layers. The top electrode layer (41) comprises one row electrode (43). The bottom electrode layer (42) comprises one center electrode (44) and two side electrodes (45) placed on the two sides of the center electrode. There are gaps (46) separating the center electrode from the side electrodes. A switchable magnetic layer (47) is placed underneath the bottom electrode layer (42). The top row electrodes and bottom column electrodes are perpendicular to each other and the magnetic layer (47) is aligned with the top row electrode layer (41) (see FIG. 4B). The display cell (40) comprises charged magnetic particles (48) in a dielectric solvent (49). In one embodiment, the particles (48) are positively charged.

Figure 5A:
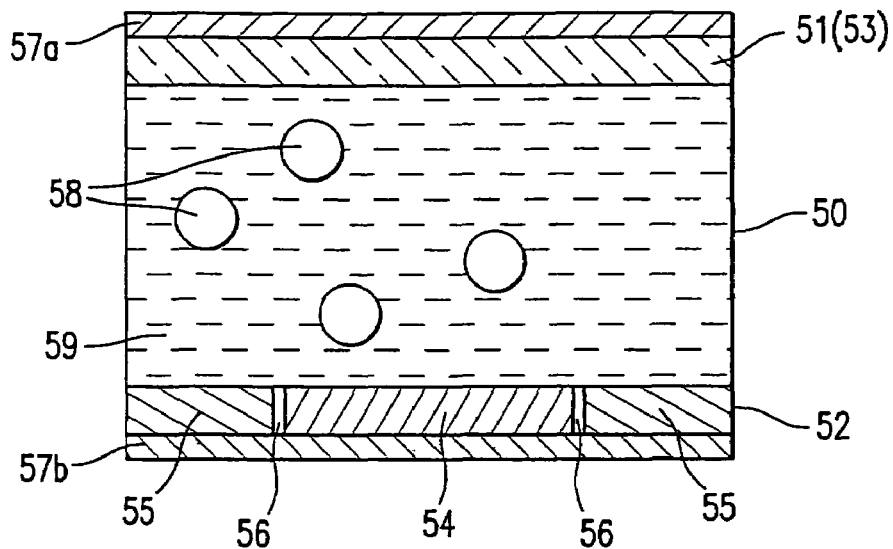
FIGS. 5A and 5B are side and top views of an EMPD device of the invention having a dual mode and two magnetic layers.
Figure 5B:
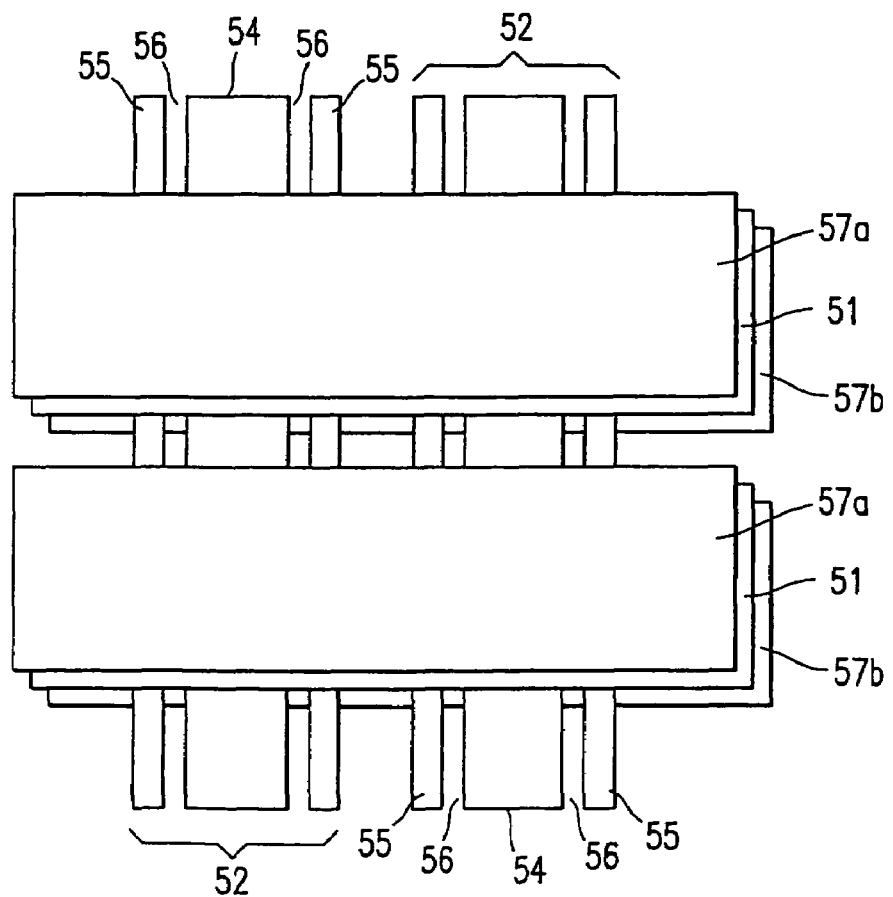

An alternative embodiment is shown in FIG. 5A, in which the basic design is similar to that of the embodiment of FIG. 4A except that there are two switchable magnetic layers (57a and 57b), one (57a) on top of the top row electrode layer (51) and the other one (57b) underneath the bottom column electrode layer (52) and the two magnetic layers are aligned with the top row electrodes (see FIG. 5B).

The basic design of a third alternative embodiment is similar to that of the embodiment of FIG. 5A except that the top magnetic layer (57a) on top of the top row electrode layer is permanent and the bottom magnetic layer (57b) underneath the bottom column electrode layer is switchable.

The basic design of a fourth embodiment is also similar to that of the embodiment of FIG. 5A except that both magnetic layers (57a and 57b) are permanent.

The displays generally may be manufactured according to the methods known in the art. The scope of the invention encompasses the conventional displays (i.e., the partition type display as shown in U.S. Pat. Nos. 3,668,106 and 3,612,758), the displays manufactured by the microcup technology (as disclosed in WO 01/67170 and WO 02/01281) and the displays manufactured by the microencapsulation technology (as disclosed in U.S. Pat. Nos. 5,961,804 and 5,930,026). In the case of the microcup-type displays, the display cells are of well-defined size, shape and aspect ratio, and are individually sealed, preferably with a polymeric sealing layer. The sealing is carried out by any of the methods disclosed in the co-pending application, U.S. Ser. No. 09/518,488, the content of which is incorporated herein by reference in its entirety. Briefly, the microcup-based cells filled with an electromagnetophoretic fluid are sealed with a polymeric sealing layer and the polymeric sealing layer may be formed from a sealing composition having a specific gravity preferably lower than that of the electromagnetophoretic fluid. In one method, the sealing is accomplished by dispersing the sealing composition in the electromagnetophoretic fluid before filling and after filling, the sealing composition forms a supernatant layer on top of the electromagnetophoretic fluid, after which, the polymeric sealing layer is hardened by solvent evaporation, interfacial reaction, moisture, heat or radiation. In another method, the sealing is accomplished by overcoating the electromagnetophoretic fluid with the sealing composition and the sealing is then accomplished by hardening the sealing composition by solvent evaporation, interfacial reaction, moisture, heat, radiation or a combination of these curing mechanisms. In both methods, the polymeric sealing layer is hardened in situ.

Alternatively, sealing of the filled microcups may be achieved by transfer laminating an adhesive layer from a release substrate onto the filled microcups, preferably followed by hardening the adhesive layer by heat, radiation or by simple solvent evaporation, and finally peeling off the release substrate.

The magnetic particles may be dispersed by any of the well-known methods, including grinding, milling, attriting, microfluidizing and ultrasonic techniques. For example, magnetic particles in the form of a fine powder are added to the suspending solvent and the resulting mixture is ball milled or attrited for several hours to break up the highly agglomerated dry pigment powder into primary particles. Low vapor pressure, non-hygroscopic solvents are preferred for the magnetophoretic or electromagnetophoretic fluid. Examples of useful solvents include, but not limited to, hydrocarbons such as decahydronaphthalene (DECALIN), 5-ethylidene-2-norbornene, fatty oils, paraffin oil, aromatic hydrocarbons such as toluene, xylene, phenylxylylethane, dodecylbenzene and alkylnaphthalene, low viscosity polyethers such as polypropylene glycols and block copolymers of ethylene glycol and propylene glycols, low viscosity silicone oils, alkyl or alkylaryl esters and ketones, halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane and pentachlorobenzene, perfluoro solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J. and perfluoropolyalkylether such as Galden from Ausimont or Krytox Oils and Greases K-Fluid Series from DuPont, Del. In one preferred embodiment, poly(chlorotrifluoroethylene) is used as a dielectric solvent. In another preferred embodiment, poly(perfluoropropylene oxide) is used as a dielectric solvent.

Sedimentation or creaming of the pigment particles may be eliminated by microencapsulating the particles with suitable polymers to match the specific gravity to that of the suspending solvent. Microencapsulation of the pigment particles may be accomplished chemically or physically. Typical microencapsulation processes include interfacial polymerization, in-situ polymerization, phase separation, coacervation, electrostatic coating, spray drying, fluidized bed coating and solvent evaporation. Well-known procedures for microencapsulation have been disclosed in Kondo, Microcapsule Processing and Technology, Microencapsulation, Processes and Applications, (I. E. Vandegaer, ed.), Plenum Press, New York, N.Y. (1974), and in Gutcho, Microcapsules and Microencapsulation Techniques, Nuyes Data Corp., Park Ridge, N.J. (1976), both of which are hereby incorporated by reference.

Magnetic particles prepared from highly magnetic compounds and metals or alloys are preferred. Examples of magnetic materials useful in this invention include, but not limited to, gamma ferric oxide, acicular magnetite, cobalt-modified or adsorbed ferric oxide, berthollide ferric oxide, chromium dioxide, metals or alloys such as stainless steel, Fe—Co, Fe—Ni, Fe—Co—Ni, Co—Ni, Co—Cr and Fe—Co—V alloys, organic polyradicals such as polymers with organic radicals in the side chain, main-chain conjugated polymers with organic radicals, two dimensional polyradicals, polymers containing paramagnetic metalloporphyrins as side chains and polymers containing paramagnetic metal ions, e.g., Cu(II), Ni(II), Mn(II) or VO(II), in the main chain. Other useful magnetic materials can be found in references such as "Magnetic Recording Handbook" by Marvin Camras; Van Norstrand Reinhold Co.,(1988); and M. Kamachi "Magnetic Polymers" in "Functional Monomers and Polymers", ed. By K. Takemoto, R. M. Ottenbrite and M. Kamachi; Marcel Dekker, Inc., (1997).

Specific examples of organic polyradicals include, but not limited to, those shown in the references identified above and several U.S. patents (e.g., U.S. Pat. Nos. 4,631,328, 4,594,400, 4,552,928 and 4,769,443). Organic polyradicals shown by Kamachi in "Magnetic Polymers" include those containing 2,2,6,6-tetramethylpiperidine-1-oxyl as a side chain, thermally annealed polyphenylacetylene, those with phenoxy or nitroxy radicals, poly(1,3-phenyleneethynylene) with pendant nitronyl nitroxide or t-butylnitroxyl, two-dimensional polymers, such as that obtained by reacting 1,3,5-triaminobenzene with iodine, those with a repeating unit derived from indigo, those obtained from the catalyst-free 1,3-dipolar cycloaddition of 1,3-bis-(3-sydnone) and N',N'-(1,4-phenylene)bismaleamide, those containing paramagnetic ions either in the side chain or in the main chain. Those containing paramagnetic ions in the side chain include those containing tetraphenylporphyrin (TPP) moieties, especially those derived from paramagnetic metal ions, for example, Cu(II), Ag(II), VO(II) and Co(II), and that derived from the reaction of TPP-Mn(II) and tetracyanoethylene in toluene. Those containing paramagnetic ions in the main chain include, but not limited to, a heterobinuclear complexes of Cu(II) and VO(II), an inorganic polymer, $MnCu(pbaOH)(H_2O)_3$ with regularly alternating magnetic centers, where pbaOH is 2-hydroxey-1,3-propylenebis(oxamato), polymers composed of 2-substituted 4,4,5,5-tetramethylimidazoline-1-oxyl-3-oxide and derived from Cu(II), Ni(II) or Mn(II), linear chain polymers of $M(hfac)_2(NIT)R$ where M is Cu(II), Ni(II) or Mn(II), (NIT)R is 2-alkyl-4,4,5,5-tetramethylimidazoline-1-oxyl-3-oxide and hfac is hexafluoroaceteylacetonate, and three dimensional structures, such as $(rad)_2Mn_2[Cu(opba)]_3(DMSO)_2:2H_2O$, where rad is 2-(4-N-methylpyridinium)-4,4,5,5-tetramethylimidazoline-1-oxyl-3-oxide, opba is o-phenylenebis(oxamato) and DMSO is dimethyl sulfoxide. Other polymeric radical containing compounds, with the identity of the radical and its location, are those described in U.S. Pat. No. 4,631,328 (various dyes [anthraquinone, stilbene, mono-, bis-, tris-azo], side chain), U.S. Pat. No. 4,594,400 (thioxanthone, side chain), U.S. Pat. No. 4,552,928 (di- and triphenylamine, side chain) and U.S. Pat. No. 4,769,443 (piperidine, side chain). Some of these organic polyradicals may be prepared by including radical precursors in the prepolymer mixture, effecting polymerization and then conversion to the radicals.

Alternatively, charged pigment (such as $TiO_2$) particles may be magnetized by microencapsulating the particles with magnetic materials. The magnetic material may be mixed with, or coated onto, pigment particles before (preferred) or after the microencapsulation process. Examples of magnetic materials particularly useful in this case include, but not limited to, metal particles or metallized particles prepared by, for example, sputtering, vacuum deposition, electrodeposition, electroplating, or electroless plating, and microencapsulating/overcoating with magnetic polymers. Charged metallized particles and charged microcapsules containing a mixture of pigments and magnetic particles are the most preferred.

The charged magnetized particles may exhibit a native charge, or may be charged explicitly using a charge control agent, or may acquire a charge when suspended in the suspending medium. Suitable charge controlling agents are well known in the art; they may be polymeric or non-polymeric in nature, and may also be ionic or non-ionic.

Figure 6A:
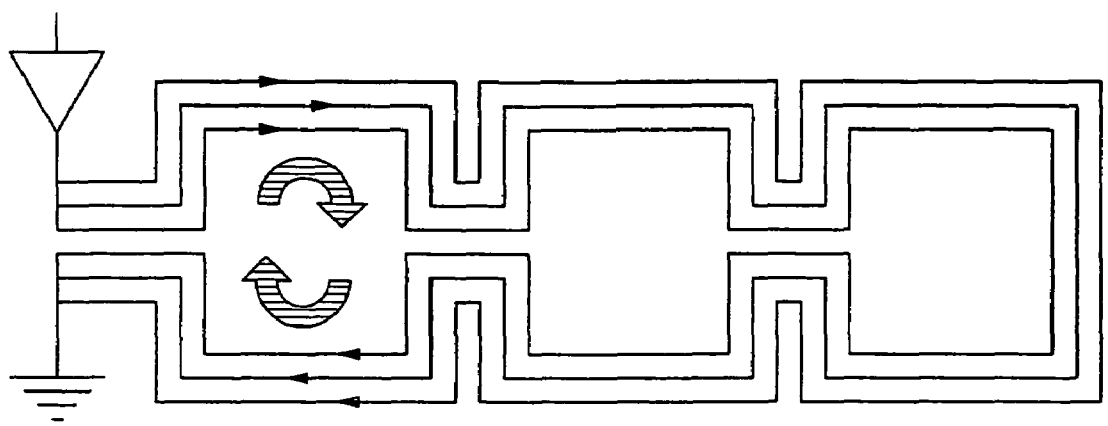
FIGS. 6A, 6B and 6C illustrate possible structures for generating magnetic field.
Figure 6B:
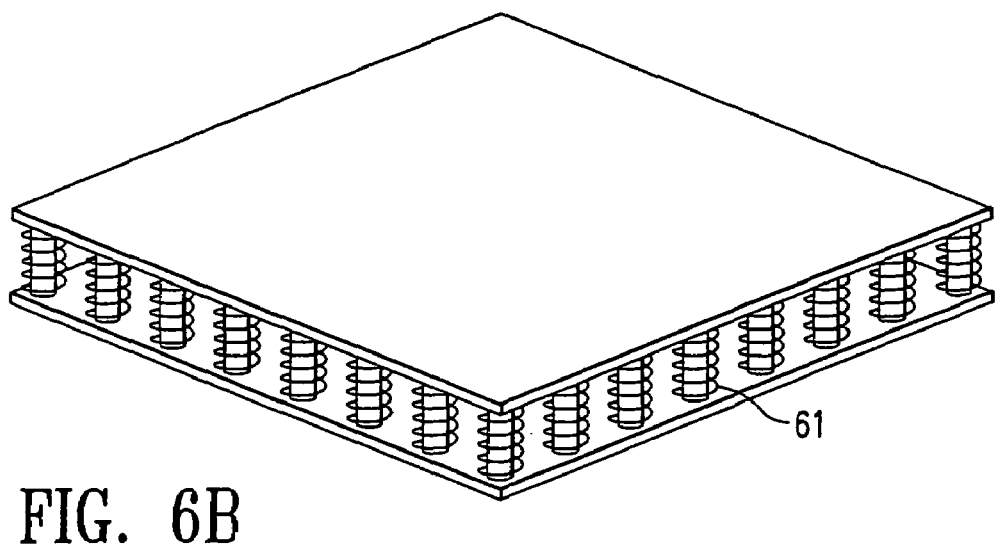
Figure 6C:
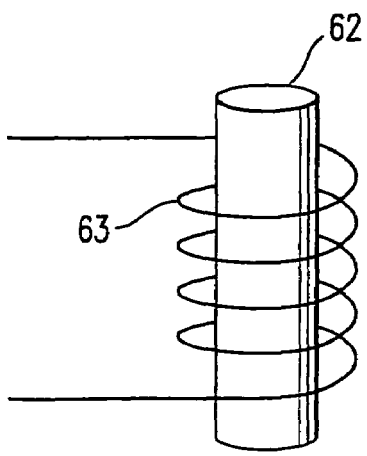

The switchable magnetic layer is formed of rows of electromagnet for generating a magnetic field. The magnetic layer is switchable (on/off) by applying or turning off a voltage to the electromagnet. FIG. 6A illustrates one useful electromagnet by using electrode structure for generating a magnetic field. FIG. 6B illustrates a switchable magnetic layer, which comprises arrays of electromagnet 61. FIG. 6C illustrates a typical electromagnet, which is a solenoid with an iron core 62. When the current is applied to the coil 63, a magnetic field is generated. A permanent magnetic layer comprises a continuous layer constructed by a permanent magnetic material. One embodiment is a ferrite magnet layer comprising ferrite powder and a polymer binder forming a flexibly or rigidly bonded permanent magnet.

Figure 7A:
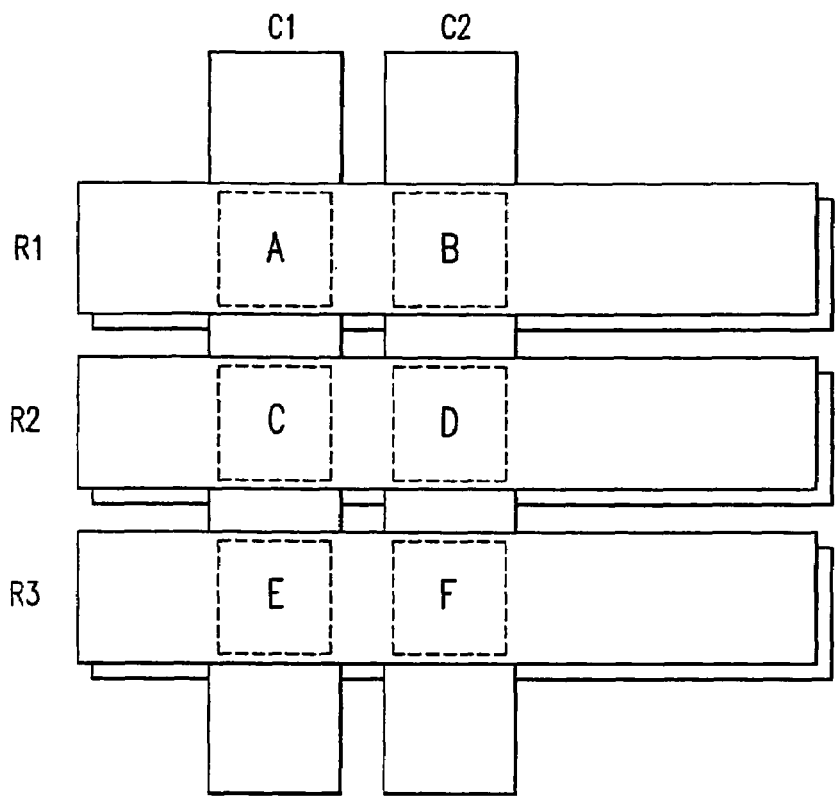
FIGS. 7A and 7B illustrate a 2×3 passive matrix of an EMPD device of FIG. 2A.

III. Electro-Magnetophoresis Display Having the Traditional Up/Down Switching Mode
  (a) Up/Down Switching Mode/One Bottom Magnetic Layer FIG. 7A illustrates a 2×3 passive matrix of the electromagnetophoretic display of FIG. 2A and shows the top view of a general 2×3 passive matrix. For the purpose of illustration, it is assumed the driving voltage in this scenario is 30V and the magnetic particles are positively charged. The particles are of the white color and are dispersed in a colored clear solvent. Thus, when the particles are at the top, the color of the magnetic particle (white in this case) is seen through the top viewing side. In contrast, the color of solvent is seen from the viewing side when the particles are at the bottom. The goal in this illustration is to drive two cells A and D to the white state and cells B and C to the color state while maintaining E and F at the reset state, which is the white state.

In FIG. 7A, row R1 has cells A and B; row R2 has cells C and D; row R3 has cells E and F; column C1 has cells A, C and E; and column C2 has cells B, D and F.

Initially the device is reset to move all particles in all six cells, A, B, C, D, E and F to the top (thus, the white color is seen). When row R1 is the scanning row and rows R2 and R3 are the non-scanned rows, the magnetic layer underneath rows R1, R2 and R3 are all turned off. In addition, the driving voltage of 30V is applied to row R1 and 0V is applied to rows R2 and R3, and at the same time a voltage of 25V is applied to column C1 and 0V is applied to column C2.

Figures 1, 7B:
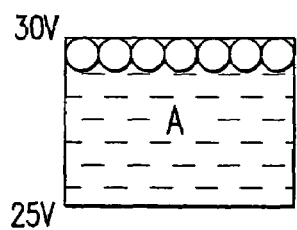

Under this driving condition:
  1) In order for the particles in cell A to remain at the top (see FIG. 7B-1), the following condition must be met:

"threshold voltage"≧5V

Figures 2, 7B:
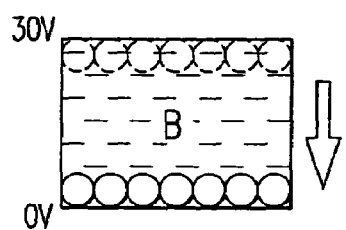

2) In cell B (FIG. 7B-2), in order for the particles to move to the bottom of the cell, the following condition must be met:

30V>"threshold voltage"

3) In cells C and E, particles are under 25V negative bias, and in cells D and F, the particles are under 0V bias, therefore the particles remain at the top of the cell.

After row R1 is scanned, the scanning takes place at row R2 while row R1 becomes the scanned row and row R3 is the non-scanned row. The magnetic layer underneath R1 is now turned on and the magnetic layers underneath R2 and R3 are turned off. The driving voltage of 30V is applied to row R2 and a voltage of 0V is applied to rows R1 and R3. At the same time, a voltage of 25V is applied to column C2 and 0V is applied to column C1.

Figures 3, 7B:
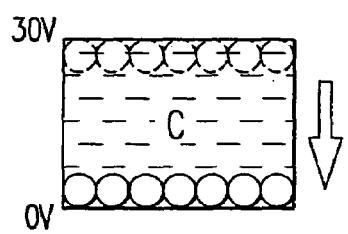
Figures 4, 7B:
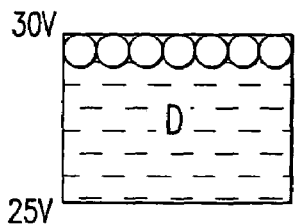

Under this driving condition:
  1) In order for the particles in cell D to remain at the top (see FIG. 7B-4), the following condition must be met:

"threshold voltage"≧5V

2) In cell C (FIG. 7B-3), in order for the particles to move to the bottom of the cell, the following condition must be met:

30V>"threshold voltage"

Figures 5, 7B:
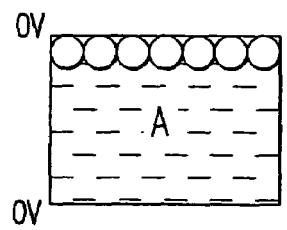

When R2 is being scanned, particles in cells A and B must remain at the locations set during the scanning phase. However, for cells A and B on the scanned row when row R2 is being scanned, the voltages applied to the row (R1) and column electrodes (C1 and C2) have changed. In addition, the magnetic layer under row R1 is now turned on.
  3) Cell A is under 0V bias (FIG. 7B-5), and therefore in order to maintain the particles at the top, the following condition must be met:

"threshold voltage"≧Vtm

Figures 6, 7B:
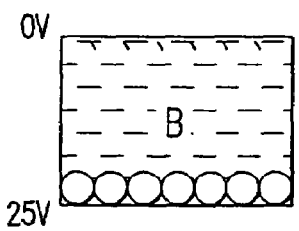

4) Cell B is under a 25 V reverse bias (FIG. 7B-6), and therefore in order to maintain the particles in this cell at the bottom, the following must be met:

"threshold voltage"+Vbm≧25V

5) In cell E, particles are under 0V bias, and in cell F the particles are under 25V negative bias, therefore the particles remain at the top of the cell.

It may be concluded from this example that if the material has a threshold voltage of 5V, the magnetic force TM then must be equal to or less than 5V electric field strength and the magnetic force BM must be equal to or greater than 20V electric field strength. In general, Vtm in this design must be equal to or less than Vbm. As to the exact strengths of the magnetic forces TM and BM required, they would depend on the particle threshold voltage, which in turn is dependent on the driving voltages applied and the nature of the particles and electrodes.
  (b) Up/Down Switching Mode/Two Switchable Magnetic Layers This section illustrates a 2×3 passive matrix of the electromagnetophoretic display of FIG. 3A. For the purpose of illustration, it is also assumed the driving voltage in this scenario is 30V. The white particles are positively charged and also magnetized.

Initially, the device is also reset to move all particles in all six cells, A, B, C, D, E and F, to the top (thus, the white color is seen).

When row R1 is the scanning row and rows R2 an R3 are the non-scanned rows, the top and bottom magnetic layers for rows R1, R2 and R3 are all turned off. In addition, the driving voltage of 30V is applied to row R1 and 0V is applied to rows R2 and R3, and at the same time a voltage of 30V is applied to column C1 and 0V is applied to column C2.

Under this driving condition:

1) There is 0V bias in cell A. The magnetic layers of R1 are turned off. The particles in cell A therefore remain at the top because of the particle bistability.

2) In cell B, in order for the particles to move to the bottom the cell, the following condition must be met:

30V>"threshold voltage"

3) In cells C and E, particles are under 30V negative bias, and in cells D and F, the particles are under 0V bias, therefore the particles remain at the top of these cells.

When most of the particles in cells A and B are near or have migrated to their destinations, both voltages applied to R1 and C1 are set to 0V, and at the same time, both top and bottom magnetic layers of the scanning row R1 are turned on. The particles already at the top in cell A therefore are attracted by the magnetic field generated between the particles and the top magnetic layer and the particles already at the bottom in cell B are attracted by the magnetic field generated between the particles and the bottom magnetic layer. As a result, the screening effect is reduced and the particles are packed tighter and remain at their desired locations.

After row R1 is scanned, the scanning takes place at row R2 while row R1 becomes the scanned row. The magnetic layers (both top and bottom) for row R1 are now turned on and the magnetic layers for rows R2 and R3 are all turned off. The driving voltage of 30V is applied to row R2. A voltage of 15V is applied to row R1 and 0V is applied to R3. At the same time, a voltage of 30V is applied to column C2 and 0V is applied to column C1.

Under this driving condition:

1) There is 0V bias in cell D. The magnetic layers of R2 are turned off. The particles in cell D remain at the top because of the particle bistability.

2) In cell C, in order for the particles to move to the bottom of the cell, the following condition must be met:

30V>"threshold voltage"

When most of the particles are near or have migrated to their destinations, the voltages applied to R2 and C2 are set to 0V, and at the same time, both the top and bottom magnetic layers of R2 are turned on. The particles already at the top in cell D are attracted by the magnetic field formed between the particles and the top magnetic layer and the particles already at the bottom in cell C are attracted by the magnetic field formed between the particles and the bottom magnetic layer. As a result, the screening effect is reduced and the particles are packed tighter and remain at the desired locations.

When row R2 is being scanned, particles in cells A and B must remain at the desired locations set during the scanning phase. However, for cells A and B on the scanned row when row R2 is being scanned, the voltages applied to the row (R1) and column electrodes (C1 and C2) have changed. In addition, both magnetic layers for row R1 are now turned on.

3) Cell A is under a 15V reverse bias, and therefore in order to maintain the particles at the top, the following condition must be satisfied:

"threshold voltage"+V$tm$≧15V

4) Cell B is also under a 15 V reverse bias, and therefore in order to maintain the particles in this cell at the bottom, the following condition must be met:

"threshold voltage"+V$bm$≧15V

5) Cell E is under 0V bias and cell F is under 30V negative bias. The particles in these cells remain at the top of the cells.

It may be concluded that if the particles have a 5V threshold voltage in this design, both the magnetic force TM and the magnetic force BM must be equal to or greater than 10V of electric field strength. In general, both Vtm and Vbm in this design must be greater than the threshold voltage and their exact strengths are dependent on the nature of the particles/electrodes and the driving voltages applied.

(c) Up/Down Switching Mode/One Permanent Top Magnetic Layer and One Switchable Bottom Magnetic Layer This section illustrates a 2×3 passive matrix of the electromagnetophoresis display having one permanent top magnetic layer and one switchable bottom magnetic layer. For the purpose of illustration, it is also assumed that the driving voltage in this scenario is 30V and the magnetic particles are positively charged.

Initially the device is also reset to move all particles in all six cells, A, B, C, D, E and F, to the top (thus, the white color is seen).

When row R1 is the scanning row and R2 and R3 are the non-scanned rows, the bottom magnetic layers for rows R1, R2 and R3 are all turned off. In addition, the driving voltage of 30V is applied to row R1 and 0V is applied to rows R2 and R3, and at the same time a voltage of 30V is applied to column C1 and 0V is applied to column C2.

Under this driving condition:

1) There is 0V bias in cell A. The bottom magnetic layer of R1 is turned off. The particles in cell A therefore remain at the top because of the particle bistability and the magnetic force formed between the particles and the top permanent magnetic layer.

2) In cell B, in order for the particles to move to the bottom the cell, the following condition must be met:

30V>"threshold voltage"+V$tm$

3) In cells C and E, particles are under 30V negative bias, and in cells D and F, the particles are under 0V bias, therefore the particles remain at the top of the cell. The magnetic force TM also assists in holding the particles in these two cells at the top. When most of the particles in cells A and B are near or have migrated to their destinations, both voltages applied to R1 and C1 are set to 0V, and at the same time, the bottom magnetic layer of the scanning row R1 is turned on. The particles already at the top in cell A therefore are attracted by the magnetic field generated between the particles and the top permanent magnetic layer and the particles already at the bottom in cell B are attracted by the magnetic field generated between the particles and the bottom switchable magnetic layer. As a result, the screening effect is reduced and the particles are packed tighter and remain at their desired locations.

After row R1 is scanned, the scanning takes place at row R2 while row R1 becomes the scanned row. The magnetic layer at the bottom of row R1 is now turned on, and the bottom magnetic layers for rows R2 and R3 are turned off. The driving voltage of 30V is applied to row R2. A voltage of 15V is applied to row R1 and 0V is applied to R3. At the same time, a voltage of 30V is applied to column C2 and 0V is applied to column C1.

Under this driving condition:

1) There is 0V bias in cell D. The bottom magnetic layer R2 is turned off. The particles in cell D remain at the top because of the particle bistability and the magnetic force between the particles and the top permanent magnetic layer.

2) In cell C, in order for the particles to move to the bottom of the cell, the following condition must be met:

30V>"threshold voltage"+V$tm$

When most of the particles are near or have migrated to their destinations, the voltage applied to R2 and C2 are set to 0V, and at the same time, the bottom magnetic layer of R2 is turned on. The particles already at the top in cell D are attracted by the magnetic field formed between the particles and the top permanent magnetic layer and the particles already at the bottom in cell C are attracted by the magnetic field formed between the particles and the bottom switchable magnetic layer. As a result, the screening effect is reduced and the particles are packed tighter and remain at the desired locations.

When row R2 is being scanned, particles in cells A and B must remain at the desired locations set during the scanning phase. However, for cells A and B on the scanned row when row R2 is being scanned, the voltages applied to the row (R1) and column electrodes (C1 and C2) have changed. In addition, the bottom magnetic layer for row R1 is now turned on.

3) Cell A is under a 15V reverse bias, and therefore in order to maintain the particles at the top, the following conditions must be satisfied:

"threshold voltage"+V$tm$≧15V

4) Cell B is also under a 15 V reverse bias, and therefore in order to maintain the particles in this cell at the bottom, the following conditions must be met:

"threshold voltage"+V$bm$≧15V

5) Cell E is under 0V bias and cell F is under 30V negative bias. The particles remain at the top of these two cells. The magnetic force TM also assists in holding the particles at the top.

From the illustration of this example, if the particle material has a 5V threshold voltage, the magnetic force TM must be equal to or greater than 10V electric field strength and the magnetic force BM must also be equal to or greater than 10V electric field strength. In general, for this design, Vtm and Vbm must be greater than the particle threshold voltage and their exact strengths are dependent on the nature of the particle/electrode and the driving voltages applied.

(d) Up/Down Switching Mode/Two Permanent Magnetic Layers

This section illustrates a 2×3 passive matrix of the electromagnetophoretic display having two permanent magnetic layers. For the purpose of illustration, it is also assumed the driving voltage in this scenario is 30V. The particles are positively charged and also magnetized.

Initially the device is also reset to move all particles in all six cells, A, B, C, D, E and F, to the top (thus, the white color is seen).

When row R1 is the scanning row and rows R2 an R3 are the non-scanned row, a driving voltage of 30V is applied to row R1 and 0V is applied to rows R2 and R3, and at the same time a voltage of 30V is applied to column C1 and 0V is applied to column C2.

Under this driving condition:

1) There is 0V bias in cell A. The particles in cell A therefore remain at the top because of the particle bistability and the magnetic force between the particles and the top magnetic layer.

2) In cell B, in order for the particles to move to the bottom the cell, the following condition must be met:

30V>"threshold voltage"+V$tm$

3) In cells C and E, particles are under 30V negative bias, and in cells D and F, the particles are under 0V bias, therefore the particles remain at the top of these cells. The magnetic force TM also assists in holding the particles at the top.

When most of the particles in cells A and B are near or have migrated to their destinations, both voltages applied to R1 and C1 are set to 0V. The particles already at the top in cell A therefore are attracted by the magnetic field generated between the particles and the top permanent magnetic layer and the particles already at the bottom in cell B are attracted by the magnetic field generated between the particles and the bottom permanent magnetic layer. As a result, the screening effect is reduced and the particles are packed tighter and remain at their desired locations.

After row R1 is scanned, the scanning takes place at row R2 while row R1 becomes the scanned row. The driving voltage of 30V is applied to row R2. A voltage of 15V is applied to row R1 and a voltage of 0V is applied to R3. At the same time, a voltage of 30V is applied to column C2 and 0V is applied to column C1.

Under this driving condition:

1) There is 0V bias in cell D. The particles in cell D remain at the top because of the particle bistability and the magnetic force between the particles and the top magnetic layer.

2) In cell C, in order for the particles to move to the bottom of the cell, the following condition must be met:

30V>"threshold voltage"+V$tm$

When most of the particles are near or have migrated to their destinations, the voltage applied to R2 and C2 are set to 0V. The particles at the top in cell D are attracted by the magnetic field formed between the particles and the top permanent magnetic layer and the particles at the bottom in cell C are attracted by the magnetic field formed between the particles and the bottom permanent magnetic layer. As a result, the screening effect is reduced and the particles are packed tighter and remain at the desired locations.

When row R2 is being scanned, particles in cells A and B must remain at the desired locations set during the scanning phase. However, for cells A and B on the scanned row when row R2 is being scanned, the voltages applied to the row (R1) and column electrodes (C1 and C2) have changed.

3) Cell A is under a 15V reverse bias, and therefore in order to maintain the particles at the top, the following condition must be satisfied:

"threshold voltage"+V$tm$≧15V

4) Cell B is also under a 15 V reverse bias, and therefore in order to maintain the particles in this cell at the bottom, the following condition must be met:

"threshold voltage"+V$bm$≧15V

5) Cell E is under 0V bias and cell F is under 30V negative bias. The particles remain at the top of these two cells. The magnetic force TM also assists in holding the particles at the top.

From this example, it may be concluded that if the particles have a 5V threshold voltage, the magnetic force TM must be equal to or greater than 10V electric field strength and magnetic force BM must also be equal to or greater than 10V electric field strength. In general, Vtm and Vbm must be greater than the particle threshold voltage and their exact strengths are dependent on the nature of the particles/electrodes and the driving voltages applied.

IV. Electro-Magnetophoresis Display Having a Dual Switching Mode (a) Dual Switching Mode/One Bottom Switchable Magnetic Layer A multi-color display having a dual mode of FIG. 4A is illustrated in this section. For the purpose of illustration, it is assumed that the particles are of the white color and are positively charged and also magnetized. The particles are dispersed in a clear colored solvent and the background of the cells is black. Thus, when the particles are at the top, the white color is seen through the top viewing side. When the particles are at the bottom, the color of solvent is seen and when the particles migrate to the side electrodes, the black color (i.e., background color of the cell) is seen, from the viewing side.

For demonstration, the driving voltage in this illustration is 40V. Initially all top row electrodes are reset to 0V, the bottom electrodes are reset to 40V and the bottom switchable magnetic layers are turned off. As a result, all particles migrate to the top of the cells resulting in a white color being seen from the viewing side.

When a row is being scanned (scanning row), a driving voltage of 40V is applied to the top row electrode and the magnetic layer of that row is turned off.

When a 40V is applied to both the bottom center electrode and the two side electrodes of cell A (see FIG. 8A), there is no positive or negative bias in this cell. However, because of the particle bistability, the particles remain at the top and a white color is seen through the viewing side.

Figure 8A:
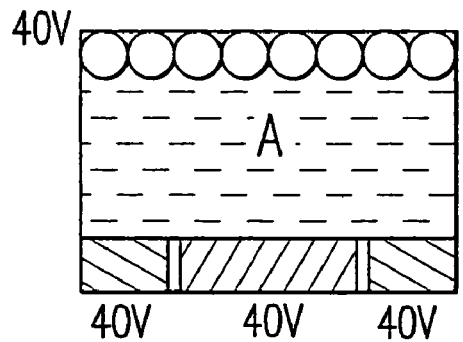
FIGS. 8A-8C illustrate an EMPD device capable of dual mode switching.
Figure 8B:
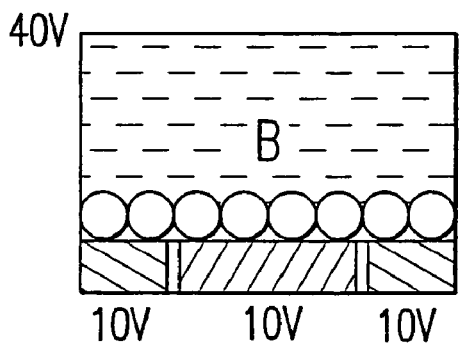

In cell B of FIG. 8B, a voltage of 10V is applied to both the center electrode and the two side electrodes, generating a 30V positive bias, which pull the particles downward and as a result, the color of the solvent is seen from the viewing side.

Figure 8C:
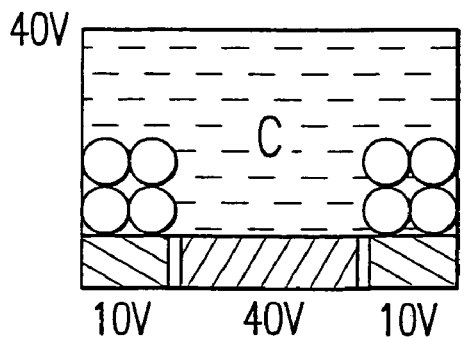

In cell C of FIG. 8C, a voltage of 40V is applied to the center electrode and 10V is applied to the side electrodes and as a result of the electric field generated, the particles migrate to the side electrodes resulting in the black background color being seen from the viewing side.

When most of the particles in cells B and C are near or have migrated to their destinations, the voltages applied to the center and side electrodes of the scanning row are set to 0V. The magnetic layer is now turned on. The particles at the bottom therefore are attracted by the magnetic field formed between the particles and the bottom magnetic layer. As a result, the screening effect is reduced and the particles are packed tighter and remain at the desired locations. For the non-scanned rows, the bottom magnetic layers are turned off and 0V is applied to the top row electrodes, which results in all particles biased to the top of the cells and remaining at the top of the cells.

After a row is scanned, that row becomes a scanned row while the next row is being scanned. For a scanned row, the magnetic layer underneath the bottom electrode layers is turned on, and the scanned cells can be in either white, color or black state. A 0V is applied to the top row electrode of the scanned row. The voltages for the bottom column electrode and the two side electrodes vary according to the states being driven on the scanning row, thus generating nine possible scenarios as illustrated below. The particles in a scanned row should remain at their locations set during the scanning phase.

1) In cell A of FIG. 8A, 0V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the top, the following condition must be satisfied:

$$40V + \text{"threshold voltage"} \geq V_{tm}$$

When the column and side electrodes are all at 10V, in order for the particles to remain at the top, the following condition must be satisfied:

$$10V + \text{"threshold voltage"} \geq V_{tm}$$

When the column and side electrodes are set at 10V-40V-10V respectively, in order for the particles to remain at the top, the following condition must be satisfied:

$$40V + \text{"threshold voltage"} \geq V_{tm}$$

2) In cell B of FIG. 8B, 0V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the bottom, the following condition must be satisfied:

$$V_{bm} + \text{"threshold voltage"} \geq 40V$$

When the column and side electrodes are all at 10V, in order for the particles to remain at the bottom, the following condition must be satisfied:

$$V_{bm} + \text{"threshold voltage"} \geq 10V$$

When the column and side electrodes are set at 10V-40V-10V respectively, in order for the particles to remain at the bottom, the following condition must be satisfied:

$$V_{bm} + \text{"threshold voltage"} \geq 40V$$

3) In cell C of FIG. 8C, 0V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the side electrodes, the following condition must be satisfied:

$$V_{bm} + \text{"threshold voltage"} \geq 40V$$

When the column and side electrodes are all at 10V, in order for the particles to remain at the side electrodes, the following condition must be satisfied:

$$V_{bm} + \text{"threshold voltage"} \geq 10V$$

When the column and side electrodes are set at 10V-40V-10V respectively, in order for the particles to remain at the side electrodes, the following condition must be satisfied:

$$V_{bm} + \text{"threshold voltage"} \geq 10V$$

In this example, the particle material threshold effect and the magnetic field strengths must meet the follow conditions:

$$V_{bm} + \text{"threshold voltage"} \geq 40V$$

$$10V + \text{"threshold voltage"} \geq V_{tm}$$

If the particle threshold effect is 5V electric field strength, Vbm must be equal to or greater than 35V and Vtm must be equal to or less than 15V. Therefore in general, the top magnetic force must be less than the bottom magnetic force. In practice, their exact strengths may be determined by the inherent particle threshold effect and the driving voltages set.

(b) Dual Switching Mode/Two Switchable Magnetic Layers

In the second alternative embodiment, the electro-magnetophoretic display differs from the design of FIG. 4A in that it has one additional switchable magnetic layer on top of the top row electrode. The magnetic fields generated by the two switchable magnetic layers are in the opposite direction. Therefore, for example, when the magnetic particles are at the top and they are attracted (pulled) to the top side by the top magnetic layer, the bottom magnetic layer pushes the particles and assists the particles migrate toward the top side although the magnetic force between the particles and the bottom magnetic layer may be negligible. In this alternative design, initially, all top row electrodes are also reset to 0V and all bottom electrodes are reset to 40V. During reset, all top magnetic rows are turned on and all bottom magnetic layers are turned off. As a result, all particles move to the top and a white color is seen from the viewing side.

When a row is being scanned (scanning row), the driving voltage of 40V is applied to the top row electrode and both the top and bottom magnetic layers are turned off. The voltages applied to the bottom center and side electrodes are those shown in FIGS. 8A, 8B and 8C. Consequently, the cells may have varied colors as also shown in FIGS. 8A, 8B and 8C.

When most of the particles are near or have migrated to their destinations, the voltages applied to the top row, bottom center and side electrodes of the scanning row are set to 0V. Both the top and bottom magnetic layers are turned on. The particles at the top are attracted by the magnetic field formed between the particles and the top magnetic layer and the particles at the bottom are attracted by the magnetic field formed between the particles and the bottom magnetic layer. As a result, the screening effect is reduced and the particles are packed tighter and remain at the desired locations.

For a non-scanned row, the magnetic layers are turned off and 0V is applied to the top row electrode, which results in all particles biased to the top of the cell and remaining at the top of the cell.

After a row is scanned, that row becomes a scanned row while the next row is being scanned. For a scanned row, both the top and the bottom magnetic layers are turned on. A 20V is applied to the top row electrode of the scanned row.

The voltages for the bottom column electrode and the two side electrodes vary according to the states being driven on the scanning row, thus generating nine possible scenarios as illustrated below. The particles in a scanned row must remain at their locations set during the scanning phase.

1) In cell A of FIG. 8A, a 20V (instead of 40V) is now applied to the top row electrode, the column and side electrodes may be all at 40V, all at 10V or at 10V-40V-10V respectively, depending on voltages applied to the scanning row. When the column and side electrodes are all at 40V, the particles remain at the top of the electrode.

When the column and side electrodes are all at 10V, in order for the particles to remain at the top, the following condition must be satisfied:

$$V_{tm}+\text{"threshold voltage"} \geqq 10V$$

When the column and side electrodes are set at 10V-40V-10V respectively, in order for the particles to remain at the top, the following condition must be satisfied:

$$V_{tm}+\text{"threshold voltage"} \geqq 10V$$

2) In cell B of FIG. 8B, a 20V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the bottom, the following condition must be satisfied:

$$V_{bm}+\text{"threshold voltage"} \geqq 20V$$

When the column and side electrodes are all at 10V, the particles remain at the bottom.

When the column and side electrodes are set at 10V-40V-10V respectively, in order for the particles to remain covering the bottom, the following condition must be satisfied:

$$V_{bm}+\text{"threshold voltage"} \geqq 30V$$

3) In cell C of FIG. 8C, a 20V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the side electrodes, the following condition must be satisfied:

$$V_{bm}+\text{"threshold voltage"} \geqq 20V$$

When the column and side electrodes are all at 10V, the particles remain at the side electrodes.

When the column and side electrodes are set at 10V-40V-10V respectively, the particles remain at the side electrodes.

Considering all above scenarios, the particle material threshold effect and the magnetic field strengths must meet the follow conditions:

$$V_{bm}+\text{"threshold voltage"} \geqq 30V$$

$$V_{tm}+\text{"threshold voltage"} \geqq 10V$$

If the particle threshold effect is 5V electric field strength, Vbm must be equal to or greater than 25V and Vtm must be equal to or greater than 5V. In general, the top and bottom magnetic field strengths may vary depending on the particle threshold effect and the driving voltages set.

(c) Dual Switching Mode/One Top Permanent Magnetic Layer and One Bottom Switchable Magnetic Layer In this embodiment, one permanent magnetic layer is on the top of the cell and one switchable magnetic layer is underneath the bottom electrode layer. The magnetic fields generated by these two magnetic layers are in the opposite direction. Therefore, for example, when the magnetic particles are attracted (pulled) to the top side by the top magnetic layer, the bottom magnetic layer pushes the particles and assists the particles to migrate toward the top side although the magnetic force between the particles and the bottom magnetic layer may be negligible. In this alternative design, initially, all top row electrodes are also reset to 0V and all bottom electrodes are reset to 40V. During reset, all bottom magnetic rows are turned off. As a result, all particles move to the top and a white color is seen from the viewing side.

When a row is being scanned (scanning row), a driving voltage of 40V is applied to the top row electrode and the bottom magnetic layer is turned off. The voltages applied to the bottom center and side electrodes are those shown in FIGS. 8A, 8B and 8C. Consequently, the cells may have varied colors as also shown in FIGS. 8A, 8B and 8C.

When the voltages applied to the bottom center and side electrodes are all at 10V or at 10V-40V-10V respectively, in order for the particles to migrate to the bottom or side electrodes, the following condition must be satisfied:

30V>V$tm$+"threshold voltage"

When most of the particles are near or have migrated to their destinations, the voltages applied to the top row and bottom center and side electrodes of the scanning row are set to 0V and the bottom switchable magnetic layer is turned on. The particles at the top are attracted by the magnetic field formed between the particles and the top magnetic layer, and the particles at the bottom are attracted by the magnetic field formed between the particles and the bottom magnetic layer. As a result, the screening effect is reduced and the particles are packed tighter and remain at the desired locations.

For a non-scanned row, the magnetic layers are turned off and 0V is applied to the top row electrode, which results in all particles biased to the top of the cell and remaining at the top of the cell.

After a row is scanned, that row becomes a scanned row while the next row is being scanned. For a scanned row, both the top and the bottom magnetic layers are turned on. A 20V is applied to the top row electrode of the scanned row. The voltages for the bottom column electrode and the two side electrodes vary according to the states being driven on the scanning row, thus generating nine possible scenarios as illustrated below. The particles in a scanned row must remain at their locations set during the scanning phase.

1) In cell A of FIG. 8A, a 20V (instead of 40V) is now applied to the top row electrode, the column and side electrodes may be all at 40V, all at 10V or at 10V-40V-10V respectively, depending on voltages applied to the scanning row. When the column and side electrodes are all at 40V, the particles remain at the top of the electrode.

When the column and side electrodes are all at 10V, in order for the particles to remain at the top, the following condition must be satisfied:

V$tm$+"threshold voltage"≧10V

When the column and side electrodes are set at 10V-40V-10V respectively, in order for the particles to remain at the top, the following condition must be satisfied:

V$tm$+"threshold voltage"≧10V

2) In cell B of FIG. 8B, a 20V (instead of 40V) is now applied to the top row electrode, the column and side electrodes may be all at 40V, all at 10V or at 10V-40V-10V respectively, depending on voltages applied to the scanning row. When the column and side electrodes are all at 40V, in order for the particles to remain at the bottom, the following condition must be satisfied:

V$bm$+"threshold voltage"≧20V

When the column and side electrodes are all at 10V, the particles remain at the bottom.

When the column and side electrodes are set at 10V-40V-10V respectively, in order for the particles to remain covering the bottom, the following condition must be satisfied:

V$bm$+"threshold voltage"≧30V

3) In cell C of FIG. 8C, a 20V (instead of 40V) is now applied to the top row electrode, the column and side electrodes may be all at 40V, all at 10V or at 10V-40V-10V respectively, depending on voltages applied to the scanning row. When the column and side electrodes are all at 40V, in order for the particles to remain at the side electrodes, the following condition must be satisfied:

V$bm$+"threshold voltage"≧20V

When the column and side electrodes are all at 10V, the particles remain at the side electrodes.

When the column and side electrodes are set at 10V-40V-10V respectively, the particles remain at the side electrodes.

Considering all above scenarios, the particle material threshold and the magnetic field strengths must meet the follow conditions:

V$bm$+"threshold voltage"≧30V

V$tm$+"threshold voltage"≧10V

30V>V$tm$+"threshold voltage"

In this example, if the particle threshold effect is 5V electric field strength, Vbm must be equal to or greater than 25V and Vtm must be equal to or greater than 5V; but less than 25V. In general, the top and bottom magnetic field strengths may vary depending on the particle threshold effect and the driving voltages applied.

(d) Dual Switching Mode/Two Permanent Magnetic Layers

In this embodiment, one permanent magnetic layer is on the top of the cell and one permanent magnetic layer is undereath the bottom electrode layer. The magnetic fields generated by these two magnetic layers are in the opposite direction. Therefore, for example, when the magnetic particles are attracted (pulled) to the top side by the top magnetic layer, the bottom magnetic layer pushes the particles and assists the particles to migrate toward the top side although the magnetic force between the particles and the bottom magnetic layer may be negligible. In this alternative design, initially, all top row electrodes are also reset to 0V and all bottom electrodes are reset to 40V. As a result, all particles move to the top and a white color is seen from the viewing side.

When a row is being scanned (scanning row), a driving voltage of 40V is applied to the top row electrode. The voltages applied to the bottom center and side electrodes are those shown in FIGS. 8A, 8B and 8C. Consequently, the cells may have varied colors as also shown in FIGS. 8A, 8B and 8C.

When the bottom center and side electrodes are set at all 10V or at 10V-40V-10V respectively, in order for the particles to migrate to the bottom or side electrodes, the following condition must be satisfied:

30V>V$tm$+"threshold voltage"

When most of the particles are near or have migrated to their destinations, the voltages applied to the top row and bottom center and side electrodes of the scanning row are set to 0V. The particles at the top are attracted by the magnetic field formed between the particles and the top magnetic layer, and the particles at the bottom are attracted by the magnetic field formed between the particles and the bottom magnetic layer. As a result, the screening effect is reduced and the particles are packed tighter and remain at the desired locations.

For a non-scanned row, 0V is applied to the top row electrode, which results in all particles biased to the top of the cell and remaining at the top of the cell.

After a row is scanned, that row becomes a scanned row while the next row is being scanned. For a scanned row, a 20V is applied to the top row electrode of the scanned row. The voltages for the bottom column electrode and the two side electrodes vary according to the states being driven on the scanning row, thus generating nine possible scenarios as illustrated below. The particles in a scanned row must remain at their locations set during the scanning phase.

1) In cell A of FIG. 8A, a 20V. (instead of 40V) is now applied to the top row electrode, the column and side electrodes may be all at 40V, all at 10V or at 10V-40V-10V respectively, depending on voltages applied to the scanning row. When the column and side electrodes are all at 40V, the particles remain at the top of the electrode.

When the column and side electrodes are all at 10V, in order for the particles to remain at the top, the following condition must be satisfied:

$Vtm+\text{"threshold voltage"} \geq 10V$

When the column and side electrodes are set at 10V-40V-10V respectively, in order for the particles to remain at the top, the following condition must be satisfied:

$Vtm+\text{"threshold voltage"} \geq 10V$

2) In cell B of FIG. 8B, a 20V (instead of 40V) is now applied to the top row electrode, the column and side electrodes may be all at 40V, all at 10V or at 10V-40V-10V respectively, depending on voltages applied to the scanning row. When the column and side electrodes are all at 40V, in order for the particles to remain at the bottom, the following condition must be satisfied:

$Vbm+\text{"threshold voltage"} \geq 20V$

When the column and side electrodes are all at 10V, the particles remain at the bottom.

When the column and side electrodes are set at 10V-40V-10V respectively, in order for the particles to remain covering the bottom, the following condition must be satisfied:

$Vbm+\text{"threshold voltage"} \geq 30V$

3) In cell C of FIG. 8C, a 20V (instead of 40V) is now applied to the top row electrode, the column and side electrodes may be all at 40V, all at 10V or at 10V-40V-10V respectively, depending on voltages applied to the scanning row.

When the column and side electrodes are all at 40V, in order for the particles to remain at the side electrodes, the following condition must be satisfied:

$Vbm+\text{"threshold voltage"} \geq 20V$

When the column and side electrodes are all at 10V, the particles remain at the side electrodes.

When the column and side electrodes are set at 10V-40V-10V respectively, the particles remain at the side electrodes.

Considering all above scenarios, the particle material threshold effect and the magnetic field strengths must meet the follow conditions:

$Vbm+\text{"threshold voltage"} \geq 30V$ $Vtm+\text{"threshold voltage"} \geq 10V$ $30V > Vtm+\text{"threshold voltage"}$ In this example, if the particle threshold effect is 5V electric field strength, Vbm must be equal to or greater than 25V and Vtm must be equal to or greater than 5V; but less than 25V. In practice, the top and bottom magnetic field strengths may vary depending on the particle threshold effect and the driving voltages applied.

For ease of illustration, it is demonstrated in all of the above embodiments that white positively charged magnetic particles are used. It should be understood that the invention is not limited to only this type of particles. There are many other particle systems, which are useful for this invention. Such particle systems may include, but are not limited to:

1. Mixture of black particles and white or other colored particles in a clear colorless solvent wherein the black particles are charged and magnetic and the white or other colored particles are non-charged and non-magnetic; or 2. Mixture of black particles and white or other colored particles in a clear colorless solvent wherein the black particles are charged and magnetic and the white or other colored particles are non-magnetic and also carry charge opposite from the black particles; or 3. Mixture of black particles and white or other colored particles in a clear colorless solvent wherein the black particles are charged and magnetic and the white or other colored particles are non-magnetic and carry the same charge as the black particles but at a different level.

As demonstrated, all of the alternative designs of the invention may be readily implemented. The field strengths of the magnetic layers may vary depending on the particle material threshold effect and the driving voltages applied during operation. The various designs within the scope of this invention have many advantages. For example, it reduces the threshold requirement because of the presence of the magnetic layer(s). When the designs have two magnetic layers, the magnetic field is turned on when the particles are near the electrodes. This feature reduces the switching time because the magnetic field continues to attract the particles during the non-scanning phase when other rows are being scanned. The electric field may be turned off before the "screening effect" takes place. The magnetic field continues pulling and packing the particles which significantly improves the contrast ratio.

It is therefore wished that this invention to be defined by the scope of the appended claims as broadly as the prior art will permit, and in view of the specification.

What is claimed is:

1. An electromagnetophoresis display which comprises (a) an array of cells filled with an electromagnetophoretic fluid comprising charged and magnetic particles dispersed in a solvent and sealed with a sealing layer which is on top of said electromagnetophoretic fluid and hardened in situ and (b) two magnetic layers, wherein both magnetic layers are switchable, or both magnetic layers are permanent, or one of the two magnetic layers is switchable and the other is permanent.

2. The electromagnetophoresis display of claim 1 wherein said array of cells are sandwiched between a top electrode layer and a bottom electrode layer, at least one of which is transparent.

3. The electromagnetophoresis display of claim 1 which has an up/down traditional switching mode.

4. The electromagnetophoresis display of claim 1 which has a dual switching mode.

5. The electromagnetophoresis display of claim 1 wherein said electromagnetophoretic fluid further comprises non-charged and non-magnetic particles.

6. The electromagnetophoresis display of claim 1 wherein said electromagnetophoretic fluid further comprises charged and non-magnetic particles.

7. The electromagnetophoresis display of claim 1 wherein said magnetic particles are paramagnetic, ferromagnetic, antiferromagnetic or ferrimagnetic particles.

8. The electromagnetophoresis display of claim 1 wherein said magnetic particles are prepared from a material selected from the group consisting of gamma ferric oxide, acicular magnetite, cobalt-modified or adsorbed ferric oxide, bertholide ferric oxide, chromium dioxide, metals or alloys and organic polyradicals.

9. The electromagnetophoresis display of claim 8 wherein said metal or alloy is stainless steel, Fe—Co, Fe—Ni, Fe—Co—Ni, Co—Ni, Co—Cr or Fe—Co—V alloy.

10. The electromagnetophoresis display of claim 8 wherein said organic polyradical is selected from the group consisting of polymers with organic radicals in the side chain, main-chain conjugated polymers with organic radicals, two dimensional polyradicals, polymers containing paramagnetic metalloporphyrins as side chains and polymers containing paramagnetic metal ions in the main chain.

11. The electromagnetophoresis display of claim 10 wherein said paramagnetic metal ion is Cu(II), Ni(II), Mn(II) or VO(II).

12. The electromagnetophoresis display of claim 1 wherein said magnetic particles are particles magnetized by overcoating or microencapsulating with a magnetic shell.

13. The electromagnetophoresis display of claim 12 wherein said magnetic shell is formed from a material selected from the group consisting of gamma ferric oxide, acicular magnetite, cobalt-modified or adsorbed ferric oxide, berthollide ferric oxide, chromium dioxide, metals or alloys and organic polyradicals.

14. The electromagnetophoresis display of claim 13 wherein said organic polyradical is selected from the group consisting of polymers with organic radicals in the side chain, main-chain conjugated polymers with organic radicals, two dimensional polyradicals, polymers containing paramagnetic metalloporphyrins as side chains and polymers containing paramagnetic metal ions in the main chain.

15. The electromagnetophoresis display of claim 14 wherein said a metal or alloy is selected from the group consisting of Ni, Cu, Co, Fe, Cr, Fe—Co, Fe—Ni, Fe—Co—Ni, Co—Ni, Co—Cr and Fe—Co—V alloys.

16. The electromagnetophoresis display of claim 12 wherein said magnetic polymer shell is formed of a polymer selected from the group consisting of polymers with organic radicals in the side chain, main-chain conjugated polymers with organic radicals, two dimensional polyradicals, polymers containing paramagnetic metalloporphyrins as side chains and polymers containing paramagnetic metal ions in the main chain.

17. The electromagnetophoresis display of claim 16 wherein said paramagnetic metal ion is Cu(II), Ni(II), Mn(II) or VO(II).

18. The electromagnetophoresis display of claim 1 wherein said magnetic particles are microcapsules containing magnetic materials dispersed in a polymeric matrix.

19. The electromagnetophoresis display of claim 18 wherein said microcapsules further comprise a pigment or dye.

* * * * *